March 25, 1930.  S. A. WESTDAHL  1,751,672
SLICING MACHINE
Filed Dec. 14, 1927
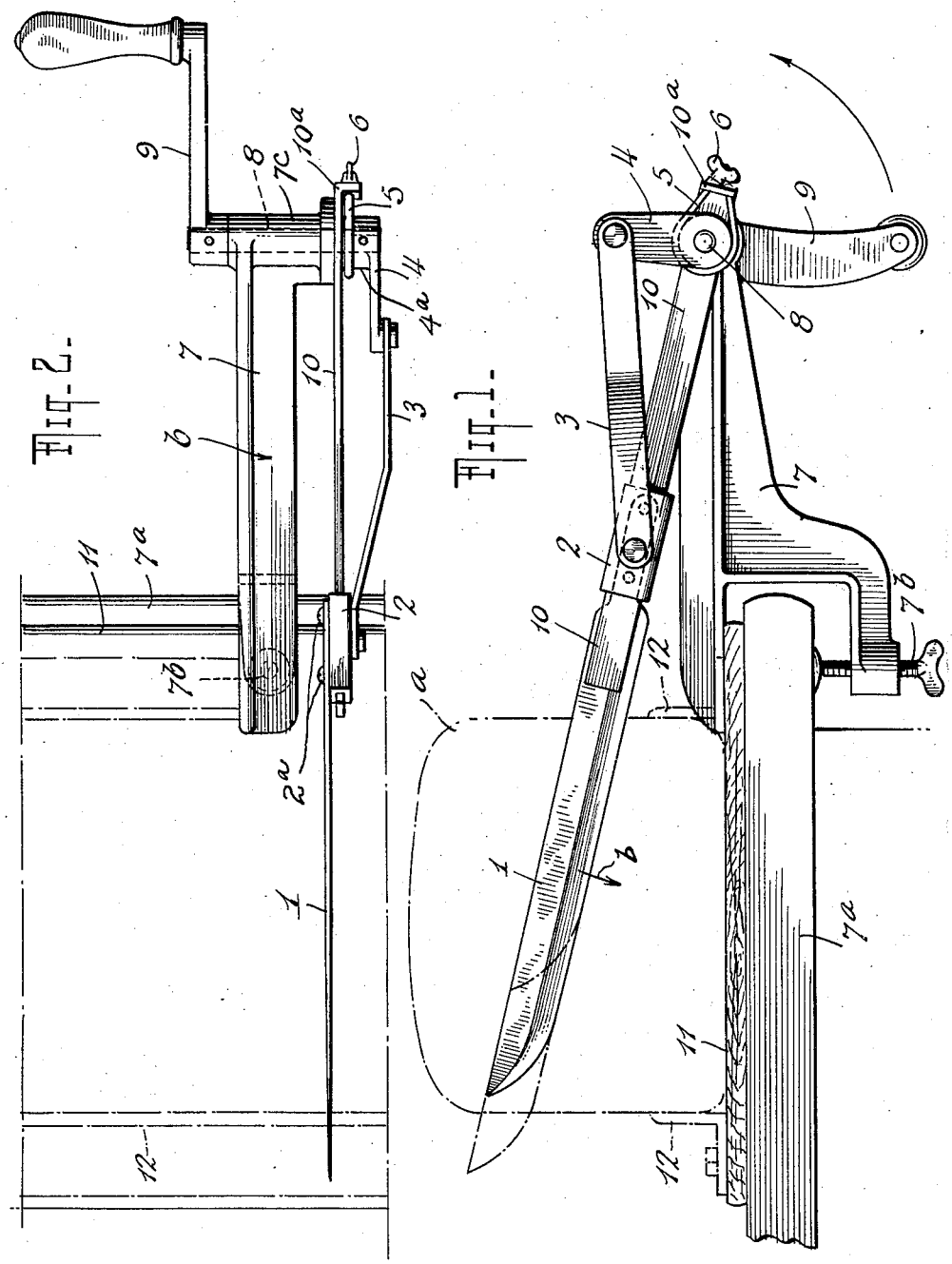
INVENTOR
SVEN A. WESTDAHL
BY
ATTORNEYS Patented Mar. 25, 1930

1,751,672

UNITED STATES PATENT OFFICE

SVEN ADOLF WESTDAHL, OF SELLERSVILLE, PENNSYLVANIA

SLICING MACHINE

Application filed December 14, 1927. Serial No. 239,828.

The invention relates to machines for slicing loaves of bread, ham, meat or other substances into successive slices, and has for its object to provide a machine of this type which is extremely simple in construction and of maximum efficiency in operation. Other more specific objects will appear from the description hereinafter and the features of novelty will be pointed out in the claims.

In the accompanying drawings, which illustrates an example of the invention without defining its limits, Fig. 1 is a side elevation of the slicing machine, and Fig. 2 is a plan view thereof.

As shown in the drawings, the slicing machine comprises a support 7 which, in the illustrated example, is shown in the form of a clamping support arranged to be attached to a table or the like $7^a$ by means of a clamp screw $7^b$. At its one end the support 7 is provided with a bearing $7^c$ in which a crank shaft 8 is journaled, said crank shaft 8 being provided at its one end with a crank 4 and at its other end with an operating device which is illustrated in the form of a crank handle 9. The crank 4 is connected by means of a link or connecting rod 3 with a knife carrier 2, which is slidably mounted upon a guide member 10. The latter is pivotally mounted upon the crank shaft 8 between the bearing $7^c$ and the hub $4^a$ of the crank 4, as shown in Fig. 2. The knife carrier 2 is provided with a cutting knife 1 which is preferably secured in position upon said carrier 2 by means of screws $2^a$ so as to be easily detachable at will. As shown in Fig. 1, the knife 1 is in the form of a conventional cutting knife of elongated form and with the guide member 10 projects in a radial direction from the crank shaft 8. For the purpose of developing a cutting pressure in the cutting edge of the knife, coincidentally with the reciprocation thereof as will appear more fully hereinafter, a friction brake 5 surrounds the hub $4^a$ of the crank 4 and has its opposite ends attached to a lug $10^a$ formed at one end of the guide member 10. For the purpose of enabling the brake 5 to be adjusted at will, a wing nut 6 is provided and the one end of said brake 5 is extended through the lug $10^a$ and screw-threaded for the reception of said nut 6.

In the operation of the device, assuming it is to be used for slicing a loaf of bread into successive slices, the loaf of bread $a$ is placed in position either directly upon the table $7^a$ or its equivalent, or upon a bed plate 11 located upon the side table $7^a$ and clamped in position by the clamping support 7, as shown in Fig. 1. To properly maintain the loaf of bread $a$ in position, suitable angle irons 12 or their equivalent may be provided on the bed plate 11, as shown in Fig. 1; in the preferred construction at least one of these angle irons 12 is adjustable to vary the distance between said angle irons for the accommodation of loaves of bread of different dimensions or of other substances to be sliced. The cutting edge of the knife having been brought into contact with the loaf of bread $a$, a rotation of the crank handle 9, in the direction of the arrow in Fig. 2, will correspondingly rotate the crank 4 and accordingly will slidably operate the knife carrier 2 to and fro lengthwise of the guide member 10. This will cause the knife 1 to be reciprocated relatively to the loaf of bread $a$ and its cutting edge to effect a cut therein, whereby said loaf of bread is sliced. As the crank 4 is rotated in the described manner, its hub $4^a$ because of its frictional engagement with the brake 5, will tend to also rotate said brake, as will be obvious. This tendency of the brake 5 to rotate is counteracted by its connection with the lug $10^a$ and accordingly is translated into a force which urges the guide member 10 in the direction of the arrow $b$ in Fig. 1 and consequently presses the knife against the loaf of bread $a$ or other substance being cut so as to develop a cutting pressure in the cutting edge of said knife. As a result of this, the knife is caused to follow the cut as the latter progressively increases in depth and consequently a most efficient cutting action in the knife is brought about, whereby the slicing operation is efficiently performed in a reliable and uniform manner. When the cut has been completed, or, in other words, when a given slice has been made, the crank handle 9 is actuated in the reverse direction whereby the knife 1 will be lifted in an opposite direction by the action of the brake 5 out of engagement with the loaf of bread $a$ and thus will permit the latter to be moved forward the required distance for the purpose of cutting another slice. The above operations are repeated until the desired number of slices have been obtained. The progressive forward movement of the loaf of bread $a$ may be manually performed against suitable stops or any conventional feeding mechanism may be provided to automatically bring about the forward shifting of said loaf of bread.

In any case the slicing operations of the machine automatically slice the loaf of bread or other substance into successive slices of uniform thickness in any predetermined number. The machine is of maximum simplicity in construction and operation and avoids all the complicated arrangements and elements of the conventional slicing machines in which a circular rotating knife is the cutting factor. In the instant slicing machine, the knife 1 may be easily removed and replaced in position or another knife may be substituted, the knife because of its conventional form being easily sharpened whenever this becomes necessary. The removal and replacement or substitution of the knife as well as the sharpening of the latter requires no special skill and may easily be performed by the merchant or other person owning and operating the machine. The slicing machine herein shown and described is of relatively small dimensions and occupies a minimum of space and may be easily attached to a table or any other suitable support. The machine may be efficiently utilized for slicing bread, ham, meat or any other substance capable of being sliced.

Various changes in the specific form shown and described may be made within the scope of the claims without departing from the spirit of the invention.

I claim:

1. In a slicing machine, the combination of a support, a cutting knife, means movably connected with said support for reciprocating said knife, and means effective upon said reciprocating means at its point of connection with said support whereby a cutting pressure is developed in the cutting edge of said knife coincidentally with the reciprocation thereof.

2. In a slicing machine, the combination of a support, a cutting knife, means movably connected with said support for reciprocating said knife, and means effective upon said reciprocating means at its point of connection with said support and operated by said reciprocating means to press said knife against the substance being cut thereby.

3. In a slicing machine, the combination of a support, a slicing knife slidably mounted on said support, means including a rotating hub on said support for reciprocating said knife relatively thereto, and means effective on said hub whereby the cutting edge of said knife is pressed against the substance being cut.

4. In a slicing machine, the combination of a support, a reciprocating slicing knife, guiding means movably connected with said support for guiding said knife in its reciprocating movements and arranged to follow the cutting progress thereof, and means effective at the movable connection between said guiding means and support whereby said knife is reciprocated relatively to said guiding means.

5. In a slicing machine, the combination of a support, a rotatable crank journaled on said support, a reciprocating slicing knife, a guide member loosely pivoted on the axis of said crank for guiding said knife in its reciprocating movements and arranged to follow the cutting progress thereof, a connection from said crank to said knife whereby the latter is reciprocated on said guide member, and means effective upon said guide member at its pivotal axis and operated by the rotation of said crank for pressing the cutting edge of said knife against the substance being cut.

6. In a slicing machine, the combination of a support, a crank-shaft journaled thereon, a crank carried by said crank-shaft, a guide member pivoted on said crank-shaft, a knife carrier slidably mounted on said guide member, a slicing knife fixed on said knife carrier, a link connecting said knife carrier with said crank, means for rotating said crank-shaft whereby said knife is reciprocated on said guide member, and means effective upon said guide member at its pivotal axis and operated by said rotating crank shaft to force the cutting edge of said knife against the substance being cut coincidentally with the reciprocation of the knife.

7. In a slicing machine, the combination of a support, a reciprocating slicing knife, guiding means pivotally connected with said support for guiding said knife in its reciprocating movements, operating means whereby said knife is reciprocated relatively to said guiding means, and a friction brake effective on said guiding means at its pivotal axis and operated by said operating means to press the cutting edge of said knife against the substance being cut, coincidentally with the reciprocation of the knife.

8. In a slicing machine, the combination of a support, a crank-shaft journaled thereon, a crank carried by said crank-shaft, a guide member pivoted on said crank-shaft, a knife carrier slidably mounted on said guide member, a slicing knife fixed on said knife carrier, a link connecting said knife carrier with said crank, means for rotating said crank-shaft whereby said knife is reciprocated on said guide member, and a friction brake carried by said guide member and engaging the hub of said crank whereby the cutting edge of said knife is pressed against the substance being cut, coincidentally with the reciprocation of the knife.

In testimony whereof I have hereunto set my hand.

SVEN ADOLF WESTDAHL.